United States Patent
Dalton (10) Patent No.: US 10,152,903 B2
(45) Date of Patent: Dec. 11, 2018

(54) SWINGING SIGN APPARATUS

(71) Applicant: SignsDirect Inc., Bloomington, IL (US)

(72) Inventor: Thomas Dalton, Heyworth, IL (US)

(73) Assignee: SignsDirect Inc., Bloomington, IL (US)

( * ) Notice: Subject to any disclaimer, the term of this patent is extended or adjusted under 35 U.S.C. 154(b) by 0 days.

(21) Appl. No.: 15/222,587

(22) Filed: Jul. 28, 2016

(65) Prior Publication Data
US 2016/0335931 A1    Nov. 17, 2016

Related U.S. Application Data

(63) Continuation-in-part of application No. 14/521,925, filed on Oct. 23, 2014, now Pat. No. 9,406,248.

(51) Int. Cl.
| | |
|---|---|
| *G09F 7/00* | (2006.01) |
| *G09F 7/22* | (2006.01) |
| *E01F 9/627* | (2016.01) |
| *G09F 15/00* | (2006.01) |

(Continued)

(52) U.S. Cl.
CPC ............... *G09F 7/22* (2013.01); *E01F 9/627* (2016.02); *G09F 7/002* (2013.01); *G09F 15/0087* (2013.01); *F16M 11/10* (2013.01); *F16M 2200/041* (2013.01); *F16M 2200/08* (2013.01); *G09F 2007/1834* (2013.01); *G09F 2007/1856* (2013.01)

(58) Field of Classification Search
CPC ... G09F 7/00; G09F 7/002; G09F 7/22; G09F 2007/1834; G09F 2007/1856; G09F 2007/1891; G09F 15/0056; G09F 15/0087; F16M 2200/041; E01F 9/627
See application file for complete search history.

(56) References Cited

U.S. PATENT DOCUMENTS

| | | | | |
|---|---|---|---|---|
| 2,054,230 | A | * 9/1936 | Patterson | .................. G09F 7/22 40/613 |
| 2,454,648 | A | 11/1948 | Green | |

(Continued)

FOREIGN PATENT DOCUMENTS

| | | | | |
|---|---|---|---|---|
| EP | 0549565 A2 | * 6/1993 | ............ | F16F 1/3821 |
| EP | 2209101 A2 | * 7/2010 | ............... | G09F 1/14 |

(Continued)

OTHER PUBLICATIONS

SignsDirect, Blank Swinger Sidewalk Sign, http://www.signsdirect.com/Home/Sidewalk-Swinger/Blank-Swinger-Sidewalk-sign.html, dated Sep. 3, 2014.

*Primary Examiner* — Ryan D Kwiecinski
(74) *Attorney, Agent, or Firm* — Banner & Witcoff, Ltd.; C. J. Galfano (57) ABSTRACT

Apparatuses are disclosed, including apparatuses providing a rotatable sign configured with a base, a display panel, and a support, where a portion of the support defines a horizontal axis and is secured to the panel. The base may be configured to hold the support to allow rotation about the horizontal axis, the height of the horizontal axis of the support may be equal to or lower than a midpoint of the panel height. In addition, apparatuses are disclosed that include a counterweight attached to a support, where some or all of the counterweight may be below the horizontal axis of the support when the support is in an initial rotational position, such that it is disposed to return a sign back to its vertical orientation when in use.

9 Claims, 8 Drawing Sheets

(51) Int. Cl.
*G09F 7/18* (2006.01)
*F16M 11/10* (2006.01)

(56) References Cited

U.S. PATENT DOCUMENTS

| | | | | |
|---|---|---|---|---|
| 2,467,187 A | * | 4/1949 | Capper | G09F 7/22 |
| | | | | 40/613 |
| 3,616,557 A | * | 11/1971 | Vara | G09F 7/22 |
| | | | | 40/602 |
| 4,214,393 A | | 7/1980 | Long | |
| 4,280,294 A | | 7/1981 | Eckberg, II | |
| 4,365,435 A | | 12/1982 | Snyder, Jr. | |
| 4,553,346 A | * | 11/1985 | Glasener | G09F 7/22 |
| | | | | 40/602 |
| 4,575,036 A | * | 3/1986 | Allekotte | G09F 7/22 |
| | | | | 248/130 |
| 4,886,232 A | * | 12/1989 | Dicke | E01F 9/627 |
| | | | | 248/576 |
| 4,912,865 A | | 4/1990 | Ellsworth et al. | |
| 4,957,258 A | * | 9/1990 | Tiedemann | G09F 7/22 |
| | | | | 248/364 |
| 5,878,518 A | * | 3/1999 | Grewe | G09F 15/0056 |
| | | | | 248/910 |
| 6,178,673 B1 | | 1/2001 | Blackford et al. | |
| 7,644,927 B2 | | 1/2010 | Law | |
| 7,819,373 B1 | * | 10/2010 | Tsai | F16M 11/10 |
| | | | | 248/346.2 |
| 2006/0137231 A1 | | 6/2006 | Phillips | |
| 2012/0017477 A1 | | 1/2012 | Sipperley et al. | |
| 2012/0186118 A1 | | 7/2012 | Nabors, Jr. | |

FOREIGN PATENT DOCUMENTS

| | | | | |
|---|---|---|---|---|
| FR | 2719412 A1 | * | 11/1995 | G09F 7/22 |
| GB | 245949 A | * | 1/1926 | G09F 15/0056 |

\* cited by examiner

SWINGING SIGN APPARATUS

CROSS-REFERENCE TO RELATED PATENT APPLICATIONS

This patent application claims the benefit of and priority to U.S. Nonprovisional patent application Ser. No. 14/521,925, filed on Oct. 23, 2014, and entitled "Swinging Sign Apparatus," where the contents of the nonprovisional application are hereby incorporated by reference in its entirety.

TECHNICAL FIELD

Aspects of the disclosure relate to apparatuses, including, in certain aspects, apparatuses for signs, in particular swinging or rotating signs. In some examples, the apparatus is portable and the components thereof are rotatable and/or moveable in response to wind or other forces. In particular, certain examples relate to a portable sign apparatus that comprises a panel displaying visual information attached to a support, the support being attached to a base. The support may include or be connected to a counterweight. The support and any attached components may be configured to rotate about a horizontal axis in response to, for example, high winds. The rotatability and/or movability of the panel and the support may prevent the wind or other forces from knocking the sign over, while simultaneously providing a desirable aesthetic appearance for the overall apparatus and the displayed object, such as a sign or sign panel.

BACKGROUND

Conventional wind-resistant signs often rely on the overall weight of the sign to resist the force of the wind. Some conventional techniques rely upon an elevated pivot point or rotational axis for the sign, for example at or above a point two-thirds of the way up the total height of the sign. By keeping the majority of the sign's weight below the pivot point, the weight of this relatively larger portion of the sign counter-balances the upper portion of the sign (in this example the upper third of the sign), when the sign is affected by the wind. This results, however, in a relatively large frame that may inhibit a viewer's ability to read the information on the sign, especially when not viewing the sign head-on, that visually obscures or detracts from the information, and/or lowers the sign's overall aesthetic appeal.

Other wind-resistant signs may consist of a square frame where the panel hangs down from a horizontal bar across the top of the frame. This configuration, however, also inhibits full view of the information or advertisement on the panel since the vertical posts that compose part of the frame inhibit full visibility of the panel from the sides and otherwise provide a visual distraction to the viewer.

Still other configurations of mobile, wind-resistant signs include signs with a minimally attractive base frame, and having a panel that is directly or indirectly secured to the bottom of the frame by heavy-duty springs. The springs allow the panel to flex in high wind conditions preventing the sign from getting blown over. However, when such a sign configuration is placed on sloping terrain, the sign generally cannot achieve a fully upright configuration, as it typically remains perpendicular to the ground regardless of the type or degree of incline. Such placement inhibits full view of the information or advertisement by a passerby when placed on such sloping or uneven terrain. Moreover, these setups generally require the use of multiple large, visually unappealing components.

To alleviate these possible inefficiencies and aesthetically unappealing configurations, it may be desirable to provide an apparatus that allows fuller viewing of the sign and the visual information or advertisement displayed thereon and less inhibited by vertical frame posts. Still more, it may be desirable to provide an apparatus that allows a sign panel to remain vertical when placed on uneven or sloped terrain, and that returns to a desired orientation after being acted upon by wind or other physical forces (e.g. human manipulation). Such an apparatus will also enhance and simplify the appearance of signs and portable signs.

SUMMARY

This Summary provides an introduction to some general concepts relating to this disclosure in a simplified form that are further described below in the Detailed Description. This Summary is not intended to identify key features or essential features of the disclosure.

In accordance with one example aspect, an apparatus is disclosed. In some examples, the apparatus includes a base, a panel and a support. In some examples, the panel has a first height at a bottom of the panel and a second height at a top of the panel. In certain embodiments, at least a portion of the support defines a horizontal axis. In various examples the support is configured to secure the panel. In some embodiments the base is configured to hold the support such that it may rotate about the horizontal axis from an initial rotational position. In certain examples, when the support is held by the base and the panel is secured by the support, a height of the horizontal axis of the support is equal to or lower than a third height, the third height being a midpoint between the first height and the second height.

In some examples, the base comprises an exterior surface enclosing a counterweight attached to the support. In certain examples the counterweight has a first mass, where all or substantially all of the first mass of the counterweight is disposed below the horizontal axis of the support when the support is in its initial rotational position. In some embodiments, the first mass of the counterweight exceeds a second mass disposed above the horizontal axis of the support when the support is in its initial rotational position, the second mass being configured to rotate with the support. In certain examples, the second mass comprises at least a portion of a mass of the panel.

In various embodiments, the counterweight comprises an exterior surface defining a reservoir. In certain examples, the reservoir is configured to receive a ballast material. In some embodiments, the ballast material comprises a liquid medium, a solid material, or both. In various embodiments, the counterweight is a solid object. In some examples, the counterweight has a shape of a triangular prism or a substantially similar shape. In various examples, the counterweight has a shape of a quadrilateral prism or a substantially similar shape.

In certain examples, the distance between the first height and the second height of the panel is about two feet. In various embodiments, the panel has a width of about three feet. In some embodiments, the distance between the first height and the second height of the panel is between about twenty and twenty-four inches. In certain examples, the panel has a width between about thirty-four and thirty-eight inches.

In various embodiments, the base comprises an access mechanism configured to provide selective access to the counterweight. In certain embodiments, the base and support are configured to allow a maximum rotation of around thirty degrees or less about the horizontal axis, in either direction, from the initial rotational position. In various examples, when the support is held by the base and the panel is secured by the support, the horizontal axis of the support is equal to or lower than a fourth height, the fourth height being one third the distance from the first height at the bottom of the panel to the second height at the top of the panel. In some embodiments, when the support is held by the base and the panel is secured by the support, the height of the horizontal axis of the support is substantially equal to the first height at the bottom of the panel. In certain examples, when the support is held by the base and the panel is secured by the support, the horizontal axis of the support is substantially adjacent to and disposed below the first height at the bottom of the panel.

In accordance with another aspect of the disclosure, an apparatus is disclosed, the apparatus comprising a base, a support, and a counterweight attached to the support. In various example embodiments, at least a portion of the support defines a horizontal axis. In some examples, the support is configured to secure a panel. In certain embodiments, the counterweight is attached to the support. In example embodiments, the base is configured to hold the support such that it may rotate about the horizontal axis from an initial rotational position. In certain examples of the apparatus, the counterweight has a first mass, and at least a majority of the first mass of the counterweight is disposed below the horizontal axis of the support when the support is in its initial rotational position. In some embodiments, the mass of the counterweight disposed below the horizontal axis exceeds a second mass disposed above the horizontal axis of the support when the support is in its initial rotational position, the second mass being configured to rotate with the support.

In various examples, the apparatus further comprises a panel having a first height at a bottom of the panel and a second height at a top of the panel. In certain embodiments, when the support is held by the base and the panel is secured by the support, the horizontal axis of the support is equal to or lower than a third height, the third height being a midpoint between the first height and the second height. In some examples, the base comprises an exterior surface enclosing the counterweight. In certain embodiments, when the support is held by the base and the panel is secured by the support, the horizontal axis of the support is substantially adjacent to and disposed below the first height at the bottom of the panel.

In accordance with yet another aspect of the disclosure, an apparatus is disclosed, the apparatus comprising a base, rotation means configured to be connected to the base, an a counterweight. In some examples, the rotation means are operably connected to one or more securing components configured to secure a panel having a first height at a bottom of the panel, a second height at a top of the panel, and a width. In various embodiments, the counterweight is configured to be operably connected to the rotation means, the panel, or both. In some examples, when the rotation means are connected to the base and the panel is secured, a horizontal rotational axis of the rotation means has a height equal to or lower than a third height, the third height being a midpoint between the first height and the second height of the panel.

In various examples of this aspect, when the rotation means are connected to the base and the panel is secured by the rotation means, the horizontal rotational axis of the rotation means has a height equal to or lower than a fourth height, the fourth height being one third the distance from the first height at the bottom of the panel to the second height at the top of the panel.

In accordance with another aspect, an apparatus such as a sign or mobile sign is disclosed. The apparatus includes a base, a panel that has a first height measured at the bottom of the panel and a second height measured at the top of the panel. The apparatus may also include a support, wherein at least a portion of the support defines a horizontal axis and wherein the support is configured to secure the panel and provide a visible bottom edge of the panel. The apparatus may also include a counterweight.

In accordance with another aspect, the apparatus may include a base that is configured to hold the support such that the support may rotate about the horizontal axis from an initial rotational position. The apparatus may also include a base that includes an exterior surface that partially encloses the support. The apparatus may also include a support that is held by the base and the panel is secured by the support. The apparatus may also include a support that includes a horizontal axis that has a height that is lower than the bottom edge of the panel.

In accordance with another aspect, the apparatus may include a base and a support. The apparatus may include a support that includes a portion of the support that defines a horizontal axis and the support is configured to secure a panel and provide a visible bottom edge of the panel. In yet another aspect, the apparatus includes a counterweight attached to the support and the base is configured to hold the support such that the support may rotate about the horizontal axis from an initial rotational position. In another aspect, the apparatus includes a base and a panel secured by the support, and the height of the horizontal axis of the support is equal to or lower than the visible bottom edge of the panel.

In accordance with another aspect, an apparatus such as a sign, such as a movable or mobile sign, is disclosed. The apparatus includes a base and a support, wherein at least a portion of the support defines a horizontal axis and wherein the support is configured to secure a panel, and wherein the base is configured to hold the support such that the support may rotate about the horizontal axis from an initial rotational position. In yet another aspect, the apparatus includes a counterweight attached to the support. In another aspect, the counterweight includes an exterior surface defining an interior counterweight reservoir and the counterweight reservoir is configured to receive a ballast material. In yet another aspect, the counterweight has a first mass when the counterweight reservoir is filled with the ballast material wherein at least a majority of the first mass of the counterweight is disposed below the horizontal axis of the support when the support is in its initial rotational position. The mass of the counterweight disposed below the horizontal axis exceeds a second mass disposed above the horizontal axis of the support when the support is in its initial rotational position and the second mass is configured to rotate with the support.

BRIEF DESCRIPTION OF THE DRAWINGS

Example embodiments of the disclosure will now be described by way of example only and with reference to the accompanying drawings, in which.

DETAILED DESCRIPTION OF EMBODIMENTS

In the following description of various examples of apparatuses, displays, signs, portable signs, and components thereof, of this disclosure, reference is made to the accompanying drawings, which form a part hereof, and in which are shown by way of illustration various example structures and environments in which aspects of the disclosure may be practiced.

It is to be understood that other structures and environments may be utilized and that structural and functional modifications may be made from the specifically described structures without departing from the scope of the present disclosure. Moreover, the figures of this disclosure may represent the scale and/or dimensions according to one or more embodiments, and as such contribute to the teaching of such dimensional scaling. However, those skilled in the art will readily appreciate that the disclosure herein is not limited to the scales, dimensions, proportions, and/or orientations shown in the figures.

The embodiments described herein provide, inter alia, apparatuses for signs, portable signs or other advertising objects that are rotatable or moveable in response to wind and/or other forces, the components of such apparatuses. In certain embodiments, the apparatus provides a portable sign including a surface or panel displaying textual and/or visual information. In various other examples, the apparatus may be used to display and/or keep erect other kinds of objects, including, but not limited to models, figures, statutes, and the like.

In some examples the apparatus is modular and configured to fit and/or interact with one or more other devices and/or components. Moreover, in certain examples two or more of the components described individually below, or that are described as being operably or directly connected, may be a single unitary component. These and other aspects, features and advantages of the disclosure or of certain embodiments of the disclosure will be further understood by those skilled in the art from the following description of example embodiments.

Figure 1:
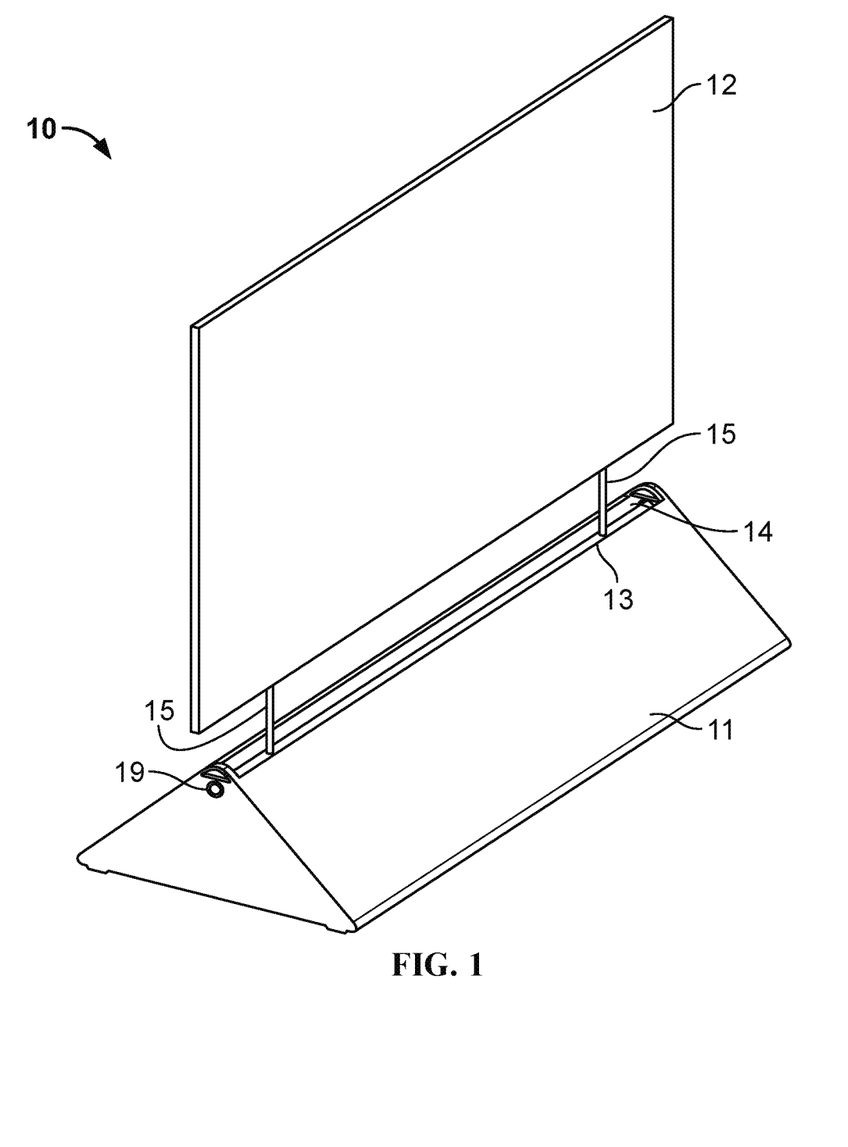
FIG. 1 shows a perspective view of an example embodiment of a rotatable sign with a removable panel attached.

In some examples, the apparatus comprises a base, a panel and a support. FIG. 1 shows a perspective view of an example embodiment of an apparatus 10. In the example embodiment of FIG. 1, the apparatus provides a rotatable and portable sign. In this example, the apparatus 10 includes a base 11, a panel 12, and a support 13 configured to secure the panel 12. In certain examples, the support and the panel are a single unitary component, while in other embodiments these components are designed to be directly and or operably connected to each other when assembled, for example (but not limited to) by an end user.

Figure 6:
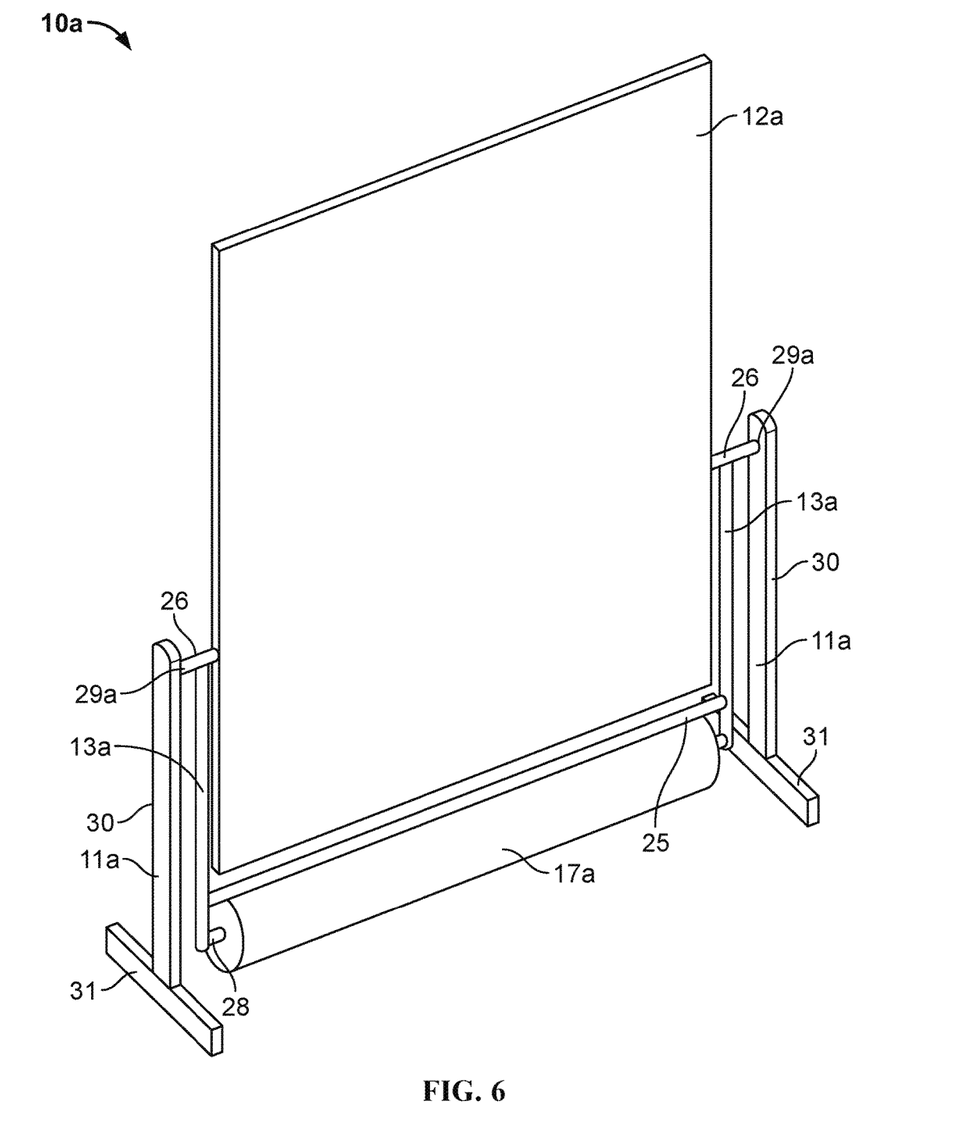
FIG. 6 shows a perspective view of a sign apparatus in accordance with another embodiment.

In some embodiments the base 11 is partially or entirely hollow and is configured to enclose one or more other components of the apparatus, while in other embodiments the base may be solid (such as, for example, the example embodiment shown in FIG. 6). The base may consist of or comprise any suitable material that is capable of sufficiently supporting the other components of the apparatus. In some embodiments the base consists of or comprises one or more of wood, plastic, ceramic, or a metal and/or a metallic alloy, including but not limited to steel and/or aluminum.

The base may be a variety of shapes and sizes depending on the desired terrain or surface the sign is to be placed on and/or the size and type of the sign itself. For example, in certain embodiments the base can be a rectangle, cube, or other geometric prism. In some embodiments the base is primarily a triangular prism in shape. In various examples, the base includes a flat bottom surface or surfaces (e.g. two prisms, one on each side of the apparatus) such that it will be flush or substantially flush to a surface, such as the ground, that it is placed on. In some examples, such as the example shown in FIG. 1, the base is shaped and sized such that most of the apparatus components outside of the panel itself are contained within the base.

For example, in the embodiment of FIG. 1, only the panel and a portion of the support are visible outside of the base. This advantageously provides a "clean" overall look in this and other embodiments, that does not detract from the visual information of the panel (or other display object) while still providing the movement and functionality described below. In some embodiments, only a portion of the support and the object to be displayed are visible above the base, providing a "floating" look for the object, such as a panel. In some embodiments, only a third of the height of the support or less is visible above the base, while in others only a fourth or less, and in still others only a fifth or less, while in yet others only half of the height or less.

In certain embodiments the base includes an access mechanism configured to provide selective access to the components inside the base. In certain examples, the access mechanism provides selective access to the counterweight. In some example embodiments, the access mechanism may be comprised of corresponding threaded components, zippers, magnets, snap fasteners, hook and loop fasteners, one or more buckles, buttons, screws, captive screws, bolts, captive nuts, latches, material flaps, hinged or sliding panels, doors, rubber gaskets, or a combination thereof.

In certain embodiments, the primary access mechanism may comprise a lock, keyed-latch, or electronic keypad/lock to prevent undesired or unauthorized access to the contents of the base 11. In various examples, the counterweight may also comprise an access mechanism, for example to allow a user to fill the counterweight with one or more ballast materials. In one example, a user may access the counterweight through a latch door or panel on the base, and then remove a threaded component, such as a cap, that may selectively interlock with threads on a fill stem on the counterweight. In this example, the user could then pour a liquid ballast material into the counterweight, re-secure the cap, and re-secure the base access door, such that the apparatus is then ready for use.

In some examples, the support is configured to directly or indirectly secure or hold one or more objects displaying visual material, such as a sign panel. The visual materials may be textual and or graphical/and in some examples the visual material provides an advertisement. In some examples, the support may consist of or comprise plastic, ceramic, wood, or a metal and/or a metallic alloy, including but not limited to steel and/or aluminum. In certain examples, at least a portion of the support defines a horizontal axis. In some examples, the support comprises an elongated member or an elongated portion along the horizontal axis. In certain examples the elongated portion is cylindrical, while in others it comprises one or more flat surfaces.

The support may comprise one or more securing components configured to secure another object, such as a sign panel, such that it is disposed above the horizontal axis when the support is attached to the base and in its initial rotational position. In some embodiments, the securing components comprise one or more clamps, clips, apertures, extension arms, fingers, or protrusions, tabs, detents, threads, or resilient materials. In various examples, the one or more securing components are configured to interact with a corresponding component on an object, such as a panel (e.g. corresponding threads or corresponding tab and detent structures) while in others the one or more securing components are configured to interact with an edge or a portion of an object/panel (e.g. a channel or aperture designed to accept the entire bottom edge of a panel (such that the actual bottom edge is not visible when the panel is attached), or one or more extensions designed to extend into the interior of a panel). In some examples, apertures or indentations are configured to receive a portion of a connector component that is attached to the object/panel.

In the example of FIG. 1, the base 11 comprises an aperture 14 and the securing components of the support 13 are extension arms 15. The aperture allows the extension arms 15 of the support 13 to extend through and above the aperture opening. In some embodiments, the panel may include openings or slits. In these examples, panel slides onto the extension arms for attachment to the support 13. In some embodiments, however, the panel may comprise extension arms designed to go into corresponding apertures or recesses in the support. In certain embodiments, the extension arms can include any of the features described above in reference to the support itself, and vice versa, and/or may comprises buttons, snaps, hook and loop fasteners, screws, bolts, nuts, rivets, magnets, or other attachment means to secure the removable panel. In certain embodiments, panel 12 can be secured to the extension arms 15 or support 13 by adhesives such as glue, epoxy, tape, rubber cement, or by chemical or mechanical weld.

The aperture 14 may have a variety of lengths and widths. In various embodiments, the width of the aperture allows the support 13 to rotate in response to physical forces, for example when increased wind velocities are encountered and push on a sign connected to the support. In some examples, the aperture width generally provides enough space to allow rotation of the support and panel to rotate about 30 degrees to either side of a horizontal axis. The rotation capability about the horizontal access may allow the support and any connected object (e.g. a panel) to maintain a substantially perpendicular orientation to the ground, or a relatively perpendicular orientation to the horizon when the apparatus 10 is placed on uneven terrain, or an inclined surface.

The panel may be any suitable material for displaying information, including textual and/or graphic and/or advertising information, or other visual material. In some examples, the panel 12 may consist of or comprise plywood, metal, plastic, corrugated plastic, steel, carbon-fiber composite, aluminum, one or more writing surfaces such as a chalk-board or white-board, one or more LED panels, one or more video or television screens, or one or more surfaces designed to receive a projection from a projector. In certain examples, some or all of the panel consists of or comprises a weather and/or water and/or sun resistant material, such that it may efficiently convey visual information even after prolonged, accumulated exposure to the elements.

The panel may be any suitable size and shape depending on the needs of the user and/or the information or visual material being displayed. In certain examples, the panel may have a variety of geometric shapes and/or sizes, for example a rectangle, a square, a trapezoid, or other geometric shapes. In some examples the panel may have an irregular, non-symmetrical or non-geometric shape, or a shape comprising a combination of one or more other shapes (e.g. multiple geometric shapes). In certain examples, the panel has a first height at bottom of the panel and a second height at the top of the panel. In some embodiments the panel is primarily rectangular in shape.

The panel may have any dimensions that are appropriate for displaying visual material, for example an advertisement. In certain examples, the panel has a width of about three feet and/or a height of about two feet. In various embodiments, the panel has a first height equal to the bottom edge or bottom-most surface/portion of the panel (for example, if the panel has a non-geometric shape), and a second height equal to the top edge of top-most surface/portion of the panel (for example, a point of a pyramidal shaped panel, or the top portion of a radius when the upper portion of the panel is curved). In some examples, the panel has a width measured from its side edges, or for the outward most extending surfaces of the side of the panel. Non-panel objects held by the apparatus may have similar dimensions and/or heights/widths and/or shapes.

In other examples, the panel has a width that ranges from about two to about four feet and/or a height of about one to about three feet. In yet other examples, the width and/or height may be equal to or less than two feet, equal to or less than eighteen inches, and/or equal to or less than one foot. In certain examples, the width and/or height may be equal to or more than three feet, equal to or more than five feet, and/or equal to or more than ten feet. In certain embodiments the total height of the panel may be between twenty and twenty-four inches, and the panel width may be between thirty-four and thirty-eight inches. The thickness of the panel may vary based on the materials used, the overall characteristics of the apparatus and/or the environment the panel is intended to be displayed in (e.g. type of exposure and/or weather conditions). In some examples, the panel is about a quarter of an inch thick, while in others about half an inch thick, while in still others it is about one inch thick, or more. In certain embodiments, the panel may have a variable thickness.

Figures 2, 3:
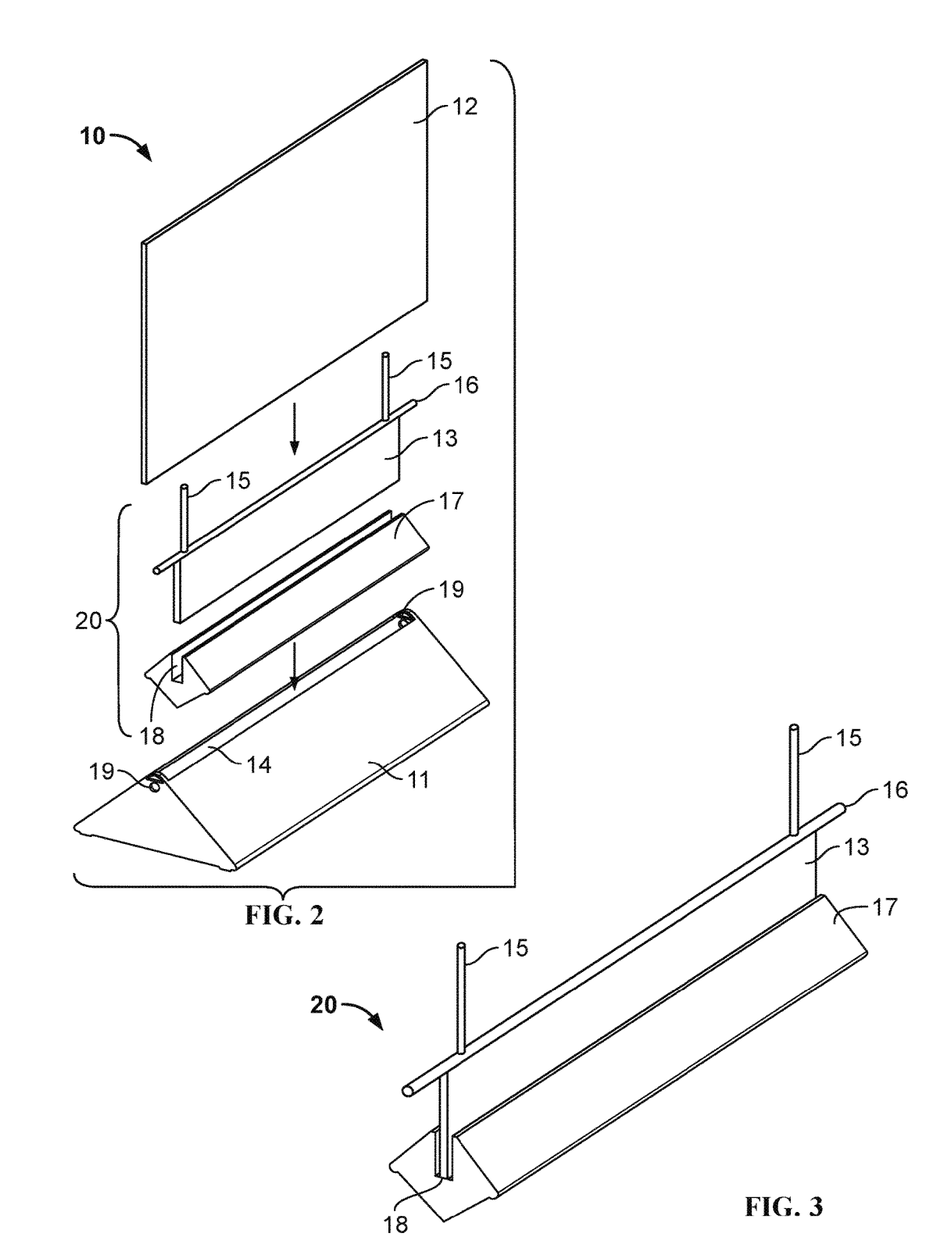
FIG. 2 shows an exploded perspective view of an example embodiment of a rotatable sign with a removable panel detached from a support, and the support detached from a counterweight that is separated from a base.
FIG. 3 shows a perspective view of an example embodiment of a counterweight attached to a support.

In certain examples, the base comprises an exterior surface enclosing a counterweight attached to the support. In the example of FIG. 2, a support module 20 is shown in an exploded view outside of the base 11. In some embodiments, the support module is composed of or comprises a counterweight 17 attached to the support 13. Support 13 may include a horizontal brace or an elongated member. In this example, the support comprises an elongated member 16. In some embodiments, the elongated member defines the horizontal axis of the support. In various examples, when the support is held by the base, the support and any connected components may rotate about the horizontal axis. The counterweight may be operably connected to the support, or may be integrally connected, or the components may be a single unitary piece. The counterweight may be attached by any suitable means to the support. In certain embodiments, the counterweight 17 is attached to the support by weld, friction, adhesive, screw, bolt, or other conventional means. Moreover, the attachment may be direct or indirect. In some examples, one counterweight is attached, while in other two or more counterweights are attached or otherwise connected.

In some embodiments, the counterweight comprises an exterior surface material defining a reservoir. The reservoir may be configured to receive a ballast material. In some of these embodiments, the counterweight is substantially hollow. In certain examples, however, the counterweight is a solid object, and in others embodiments the counterweight includes one or more reservoirs or cavities designed to hold another material (e.g. ballast), such that a portion or portions of the counterweight are hollow while others are solid.

In certain embodiments, the counterweight is primarily a quadrilateral prism in shape. In other embodiments, the counterweight can be a triangular prism, cube, cylinder, sphere, or other geometric shape/prism. In various examples, the counterweight has a shape such that it has a relatively low center of mass when in use in the apparatus and oriented in the initial rotational position, such as a quadrilateral prism with a "point" of two sides meeting at the bottom of the prism, or an inverted "teardrop" shaped prism. In some example embodiments, the counterweight 17 is composed of or comprises a thermoplastic material, a metal and/or metallic alloy, including but not limited to steel, lead, tungsten, or aluminum, or wood.

In some example embodiments, the counterweight's external surface defines an internal reservoir that is configured to receive a ballast material. In certain embodiments the internal reservoir is defined by a second material contained within or connected to an interior surface of the counterweight (e.g. the interior surface of the exterior surface material) or another component or portion of the counterweight. In certain examples, the second material consists of or comprises plastic, rubber, metal, tin, aluminum, ceramic, glass, or fabric.

The ballast material may comprise a liquid medium, a solid material, or both. In certain embodiments the ballast is a liquid medium. In some embodiments the liquid medium can consist or comprise water, saline, anti-freeze, or other mixture. In various examples, the liquid medium may comprise a relatively viscous (as compared to water) or a high viscosity component. In certain of these examples, the liquid ballast comprises glycerine. In other examples, the liquid medium has a similar or lower viscosity as compared to water.

In other example embodiments, the ballast is a solid material. In some embodiments the solid material can comprise sand, gravel, dirt, rocks, metal (e.g. lead) or another solid material. In yet other examples, the ballast may comprise both solid and liquid components, including embodiments where the ballast is a slurry. As described above, in certain embodiments, the base 11 may include an access mechanism configured to provide selective access to the counterweight 17. Access to the counterweight may provide the user simplified filling and emptying of liquids or materials from the internal reservoir, for example filling the counterweight when the sign is in a position to be visually displayed and removing the ballast when the sign is desired to be transported to another location or taken down. Removal of the internal ballast increases the mobility of the sign 10 when it is to be moved or relocated. This can further enhance the portability of the apparatus.

In various examples, the counterweight is partially solid, such that it has enough mass so that, even if the reservoir is empty, it can still function as a counterweight for at least some types and/or sizes of panels or other visual materials. For example, the counterweight may comprise a solid material providing approximately 30% or less of the total counterweight mass when filled with a ballast material. In other examples, the solid material may provide approximately 40% or less of the total counterweight mass, and in still others approximately 60% or less of the total counterweight mass.

In certain embodiments, the counterweight has a mass of approximately 5 pounds or more, in other approximately 7.5 pounds or more, and in still others approximately 10 pounds or more. These weights may reflect the total mass of the counterweight with the ballast included, in some examples, and in others may reflect the weight of a solid or partially solid counterweight (including those that may accept additional ballast). In the examples of the counterweight including the reservoir, the amount of mass added by the ballast may vary depending on the size and volume of the reservoir, in addition to the type of ballast used. In certain examples, the volume of the reservoir is selected so a particular ballast material (e.g. water) adds approximately 3 or more pounds of mass, in others approximately 5 pounds or more, in others approximately 7.5 pounds or more, and in still others approximately 10 pounds or more.

In some examples the counterweight has a first mass, where all or substantially all of the first mass of the counterweight is disposed below the horizontal axis of the support when the support is in its initial rotational position. In some examples, 90% or more of the mass is disposed below the horizontal axis, while in others 80% or more, and in still others 70% or more is disposed below the horizontal axis. In various embodiments, the first mass of the counterweight exceeds a second mass disposed above the horizontal axis of the support when the support is in its initial rotational position, the second mass being configured to rotate with the support and comprising at least a portion of a mass of the panel. For example, the second mass may include any or all portions of any object or panel disposed above the horizontal axis (in the initial rotation apposition) as well as any portions of the support or any other components that are disposed above the axis in the initial position.

Thus, if the first mass disposed below the axis, whether comprising the entire mass of the counterweight and optionally a ballast material, or a substantial position of the counterweight mass, or further including a portion of the mass of the support from support positions or components disposed below the axis, exceeds a second mass equal to the mass of components disposed above the axis, the apparatus will preferentially reorient to the initial rotational position. When wind or other physical forces act upon the apparatus, the relatively larger lower mass will, due to gravitational forces, seek to return to the initial rotation position.

The example of FIG. 2 further shows a base 11 including a plurality of rotation positions 19. As described above, support 13 may include a horizontal axis defined by an elongated member 16, or another structure(s), that is attached to the rotation positions 19. In some embodiments, however, the support may lack a component or components that is substantially coincident with the horizontal axis, and the axis is primarily defined solely by a line extending between the rotation positions. For example, the support may include rotation means, such as small extension arms extending into corresponding cavities in the base, but the support is otherwise lacking an elongated or cylindrical portion.

In certain embodiments, the support module 20 and attached panel 12 can rotate or swivel about the horizontal axis 16 when installed and connected to the rotation positions 19. In this manner, the base may be configured to hold the support such that it may rotate about the horizontal axis from an initial rotational position. In certain embodiments the components of the rotation positions 19 and/or rotation means comprise one or more hinges, bearings, swivel connections, and/or joints. In some examples, the rotation positions and/or rotation means comprise ball bearings or other friction minimizing devices. Further, in certain embodiments, the ball bearings may be consist of or comprise one or more metal and/or metallic alloys, such as steel, aluminum, or titanium, ceramics, or plastics.

In the example of FIG. 3, support module 20 includes the support 13 attached to the counterweight 17. In this example, the counterweight 17 includes a support slot 18 where the support is mated to the counterweight so the assembled whole is configured to counterbalance the weight of the upper portions of an object or objects connected to or mounted above the support, such as a sign panel.

In some examples, the horizontal rotational axis is coincident and defined by the placement of horizontal, elongated member 16, when secured to rotation positions 19. As described in more detail elsewhere in the present disclosure, in other embodiments that axis may be defined by a line between the rotation positions of the base and/or by other components such as rotation means (for example, as illustrated in the embodiment of FIG. 6). In certain embodiments, when the apparatus is assembled the horizontal member 16 has a height equal to its horizontal axis of rotation. In some examples, the axis of rotation may have a height midway between the bottom of the panel and the top of the panel, when the apparatus is assembled, or lower. In another embodiment, the third height of the horizontal axis is substantially equal to the bottom of the panel (e.g. within an inch or less, or within half an inch or less), or lower, when the panel is attached. In yet another embodiment, when the support is held by the base and the panel is secured by the support, the height of the horizontal axis is substantially adjacent to and disposed below the bottom of the panel.

For example, the height of the axis may be approximately one inch below the bottom of the panel, where the securing components span the interim distance. In other embodiments, the axis may be even lower, which may further provide a "floating" look for the panel. For example, the axis may be approximately three inches or more below the bottom edge, or six inches or more below the bottom edge. This embodiments may provide a particularly interesting visual look when the securing components are thin, e.g. arms that are a quarter of an inch or less in width, or half an inch or less in width, or otherwise difficult to see (for example, when having a color selected to be similar to a particular background where the sign will be displayed). In some examples, it is contemplated that there are no additional components of the apparatus, outside of the panel or visual object itself, that are visible above the bottom of the panel (e.g. embodiments where arms from the support extend into the panel from its bottom edge). In certain examples, there are no additional components of the apparatus, outside of the panel itself, that are visible above the midpoint of the panel, and in others no components visible above a height a third of the distance from the bottom to the top of a panel.

In some examples, the weight distributed below the horizontal axis may be composed primarily or entirely of counterweight 17 and a portion of the support 13. In certain embodiments, the entire counterweight is disposed below the horizontal axis when the components are in the initial rotation position. In other examples, some of the counterweight may be disposed at a height equal to or above the horizontal axis, depending on shape and method of attachment, as long as enough of the counterweight is disposed below the horizontal axis such that it, along with the any portions of the support disposed beneath the axis and any other connected components beneath the axis, provide a sufficient mass to counter the weight of the panel and/or other components or parts disposed above the horizontal axis. In certain examples, all or substantially all of the counterweight mass is disposed below the horizontal axis of the support when the support is in its initial rotational position, and the mass of the counterweight exceeds the total mass disposed above the horizontal axis of the support when the support is in its initial rotational position, where each mass above and below the horizontal axis is configured to rotate with the support.

This total weight of the counterweight and/or other components may define a first mass that is disposed below the horizontal axis, in certain embodiments. A second mass may consist of the weight of the panel 12 and a portion of the support, e.g. the extension arms. The second mass may be disposed above the horizontal axis. Such a mass distribution may allow the support 13 to keep the panel erect in an initial rotational position, even when the apparatus is placed on uneven or sloping terrain. Further, the support rotates about the horizontal axis when wind velocities create enough of a moment to impact the counterbalance.

In certain example embodiments, the base 11 and support 13 are configured to allow a maximum rotation of about 30 degrees, in either direction, about the horizontal axis defined by the horizontal member 16. In other example embodiments apparatus may be configured to provide a maximum rotation may be about 45 degrees, or less, to either side of the horizontal axis, while in others about 30 degrees of less, or 20 degrees of less. In yet other examples where the base does not restrict the rotation by enclosing the counterweight (for example, the example embodiment shown in FIG. 6), it may exceed 90 degrees about either side of the horizontal axis. In some examples, the apparatus may comprise additional components that restrict rotation, such as protrusions blocking additional movement, or may utilize hinges or other components that are only capable of a defined rage of rotation. In other examples, the apparatus may comprise springs or other resilient and/or elastomeric materials that are disposed to urge the components back towards the initial rotational position when a certain degree of rotation is reached (e.g. for example thirty degrees or more from the initial rotational position).

Figure 4:
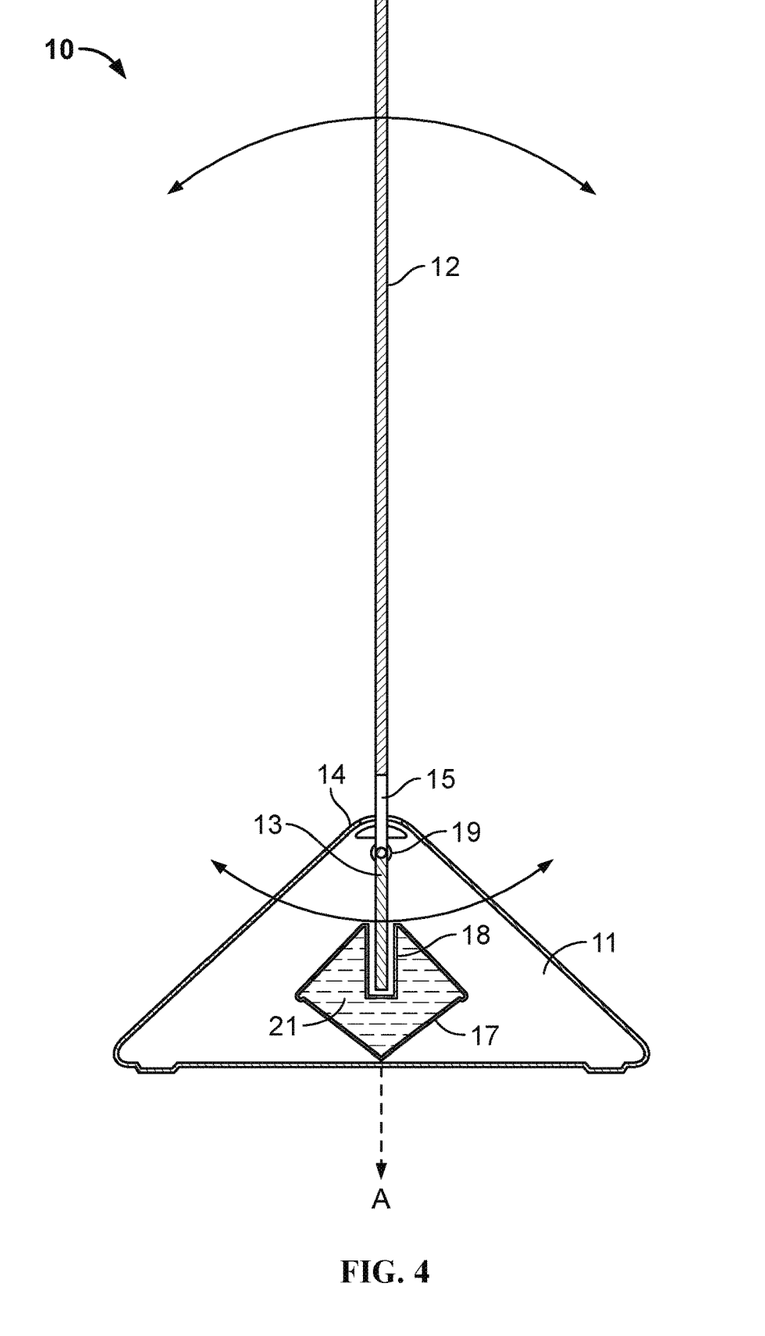
FIG. 4 shows a cross-sectional side view of the example embodiment of FIG. 1 with the panel attached to the support and the support in an initial rotational position.

FIG. 4 shows a cross-sectional side view of an example embodiment of the apparatus. In this example, counterweight 17 includes an internal reservoir filled with a liquid medium 21. Further, the support 13 is held by the base 11 and the panel 12 is secured by the support 13, the horizontal axis 16 of the support is substantially adjacent to and disposed below the first height at the bottom of the panel on a level surface. The counterbalance 17 holds the support 13 and panel 12 in a perpendicular orientation to the level surface and this defines the initial rotational position of about 0 degrees. Other examples may include initial positions from other angles depending upon the size and shape of the base and/or the incline of the terrain where the apparatus is placed.

Figure 5:
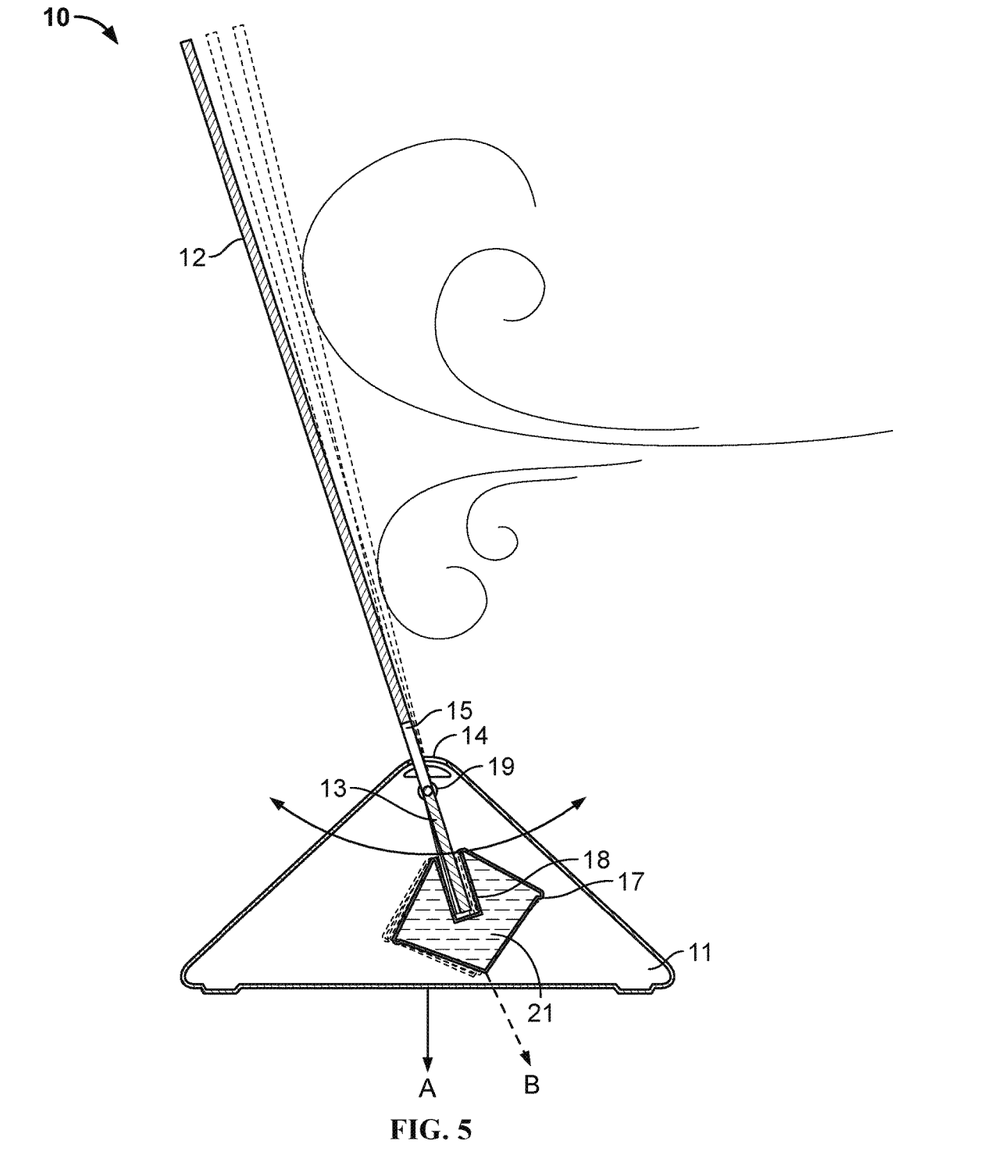
FIG. 5 shows a cross-sectional side view of the example embodiment of FIG. 4 with the panel attached to the support and the support rotated about the horizontal axis to a subsequent rotational position due to the force of the wind.

FIG. 5 shows an example of the support 13 is held by the base 11 and the panel 12 is secured by the support 13 and the configuration has rotated roughly 15 degrees about the horizontal axis due to the force of the wind. Such a configuration may prevent the apparatus from getting blown over. In this example, counterweight 17 is filled with ballast 21 and has a mass greater than the mass above the horizontal axis. This configuration may keep the panel 12 erect and visible in the presence of wind, or after other physical forces act on the panel, as the relatively larger mass will always be disposed to rotate back to its lowest point due to gravitational forces, i.e. the initial rotational position. Thus, the counterweight allows reorientation of the support and any connected components, such as a panel, to their initial position. In some examples, the counterweight also provides enough mass to the apparatus to prevent it from easily moved or getting blown over in high wind situations.

In another aspect of the disclosure, an apparatus is disclosed, the apparatus comprising a base and a support, where at least a portion of the support defines a horizontal axis and wherein the support is configured to secure a panel, and a counterweight attached to the support. In some examples of this aspect, the base is configured to hold the support such that it may rotate about the horizontal axis from an initial rotational position, and the counterweight has a first mass, where at least a majority of the first mass of the counterweight is disposed below the horizontal axis of the support when the support is in its initial rotational position, and where the mass of the counterweight disposed below the horizontal axis exceeds a second mass disposed above the horizontal axis of the support when the support is in its initial rotational position, the second mass being configured to rotate with the support.

In certain examples of this aspect, the apparatus further comprises a panel having a first height at a bottom of the panel and a second height at a top of the panel. In some examples, when the support is held by the base and the panel is secured by the support, the horizontal axis of the support is equal to or lower than a third height, the third height being a midpoint between the first height and the second height. In yet other examples, the base comprises an exterior surface enclosing the counterweight. In some examples, when the support is held by the base and the panel is secured by the support, the horizontal axis of the support is substantially adjacent to and disposed below the first height at the bottom of the panel.

FIG. 6 shows a perspective view of an example embodiment of a portable sign apparatus 10a, where this example embodiment does not include a base that encloses other components of the apparatus, such as the counterweight. This embodiment includes panel 12a attached rotation means 26, which in this embodiment are arms or protrusions configured to rotate via an attachment to a base 11a, for example by insertion into a corresponding cavity or bearing. In this example, rotation means 26 define the horizontal axis in this embodiment. Counterweight 17a is attached to the counterweight brace 28 which is attached at each end to support 13a. In this example, base 11a comprises legs 30 that attached to feet 31. A lower horizontal brace 25 is situated above the counterweight 27, but this additional brace is not required. In examples with the additional brace, the counter weight may be partially or entirely disposed beneath the lower horizontal brace 25, or between an optional counterweight brace 28 and the lower brace 25. Similar to the embodiments described above, rotation means 26 attach to the rotation positions 19a, and may comprise or consist of any of the structure described above, or similar structures. This advantageously provides other examples of apparatuses that display panels or other objects without large components (such as a frame extending above the midpoint of the object or panel) that detract from the object, while still allowing the desired rotation and the reorientation functionality. Moreover, these embodiments provide the capability of increased rotation compared to at least some of the embodiments using a base enclosing other elements, and the base itself could limit the possible degrees of rotation (as the counterweight cannot rotate through the sides of the base). Here, advantageously, more rotation is possible as compared to certain embodiments, but the similar weight and mass distribution and rotation axis still provide beneficial functionality.

Figure 7:
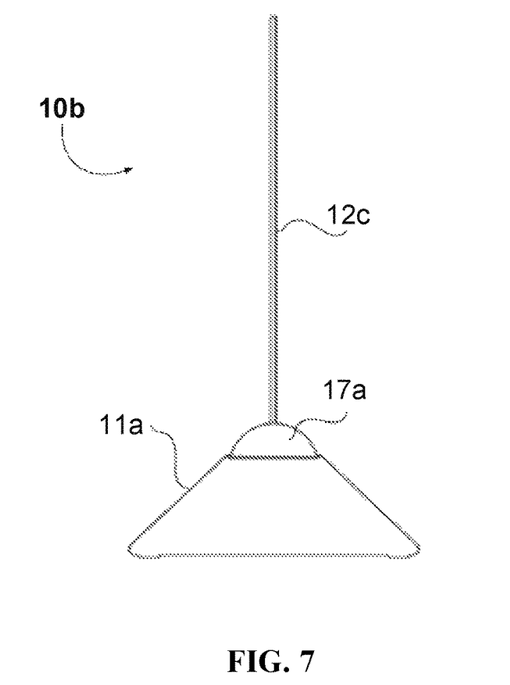
FIG. 7 shows a side view of a sign apparatus in accordance with another embodiment with the panel attached to the support and the support in an initial rotational position.

FIG. 7 shows a side view of an example embodiment of the portable sign apparatus 10b. In this example, the support 17a is held by the base 11a and the panel 12c is secured by the support 17a. In certain examples of this aspect, the base 11a can include an exterior surface that partially or fully encloses the support 17a. In this example, it encloses half of the support. In some embodiments the base 11a is partially or entirely hollow and is configured to enclose one or more other components of the apparatus, while in other embodiments the base may be solid. In certain examples, the base defines a cavity within which the support, or a portion thereof, may rotate within. The base may consist of or comprise any suitable material that is capable of sufficiently supporting the other components of the apparatus. In some embodiments the base consists of or comprises one or more of wood, plastic, ceramic, or a metal and/or a metallic alloy, including but not limited to steel and/or aluminum.

Figure 8:
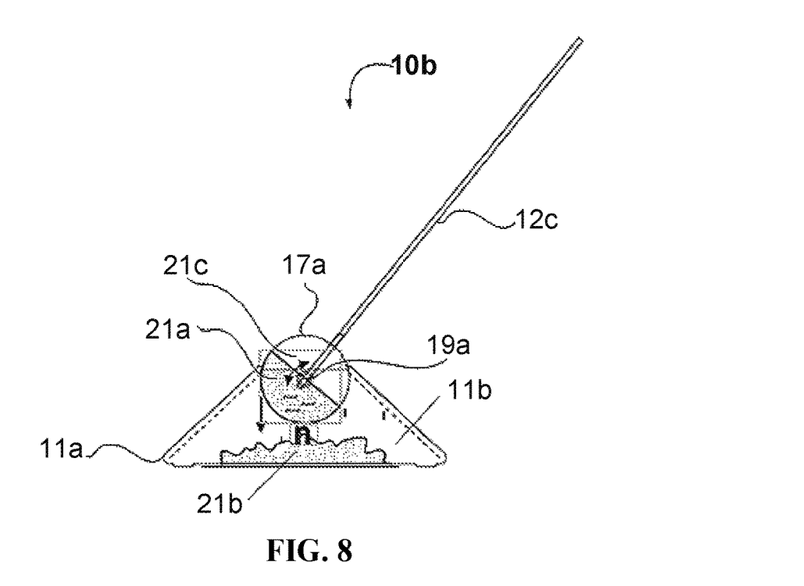
FIG. 8 shows a cross-sectional side view of the example embodiment of FIG. 7 with the panel attached to the support and the support in a rotational position.

FIG. 8 shows a cross-sectional side view of an example embodiment of the portable sign apparatus 10b. In this example, support 17a includes an internal reservoir 21c fillable with a ballast material 21a. The internal reservoir 21c acts as a counterweight. In certain examples, the internal reservoir defines a portion of the internal area of the support (e.g. half, or a quarter) while in other is may be different amounts, such as the entire internal area. Further, the support 17a is held by the base 11a and the panel 12c is secured by the support 17a. The horizontal axis 19a of the support is substantially adjacent to the first height at the bottom of the panel, but other heights may be used. The support may hold the panel so that the bottom of the panel is visible, or the bottom edge may be within the support (e.g. within a cavity or channel) such that a visible bottom edge of the panel is present where the panel meets the support. The internal reservoir (acting as a counterweight) 21c holds or orients the support 17a and panel 12c in a perpendicular orientation to the level surface and this defines the initial rotational position of about zero degrees. Other examples may include initial positions from other angles depending upon the size and shape of the base and/or the incline of the terrain where the apparatus is.

In this example, base 11a further includes an exterior surface that partially or fully encloses the support and defines a base reservoir 11b that is configured to receive a an additional ballast material 21b. Ballast material 21a and 21b can include a liquid medium (e.g. water, glycerin, or an aqueous solution), a solid material (e.g. dirt, sand, gravel), a combination thereof (e.g. wet sand), or a slurry. The ballast materials may be the same, or may be different. In some example embodiments, the support 17a can have the shape of a cylinder, rectangle, or triangular prism, or other applicable geometric shape. In this example, the support has the shape of a cylinder, and approximately half the cylinder is within the base and half above it. In this example, about half of the internal reservoir is filled. In some examples, the support may include one or more internal walls so that the ballast fills a portion of the support. The wall or walls may be positioned such that the filled area is the bottom portion of the support (e.g. the bottom half) to aid in stability and rotation back to the original rotational position.

In certain example embodiments, the counterweight has a first mass that is disposed at the horizontal axis 19a of the support when the support 17a is in its initial rotational position, and the first mass of the counterweight exceeds a second mass disposed above the horizontal axis of the support when the support is in its initial rotational position, and the second mass is configured to rotate with the support and includes at least a portion of a mass of the panel. In another example embodiment, the top half, top third, top two thirds, or other portion of the cylindrical support 17a is visible when in the initial rotational position and the bottom half of the cylindrical support 17a defines the interior counterweight reservoir 21a. In another example embodiment, the sign apparatus 10b includes one or more access mechanisms configured to provide selective access to one or both reservoirs. The access mechanisms may be used to add a ballast material or materials.

Figure 9:
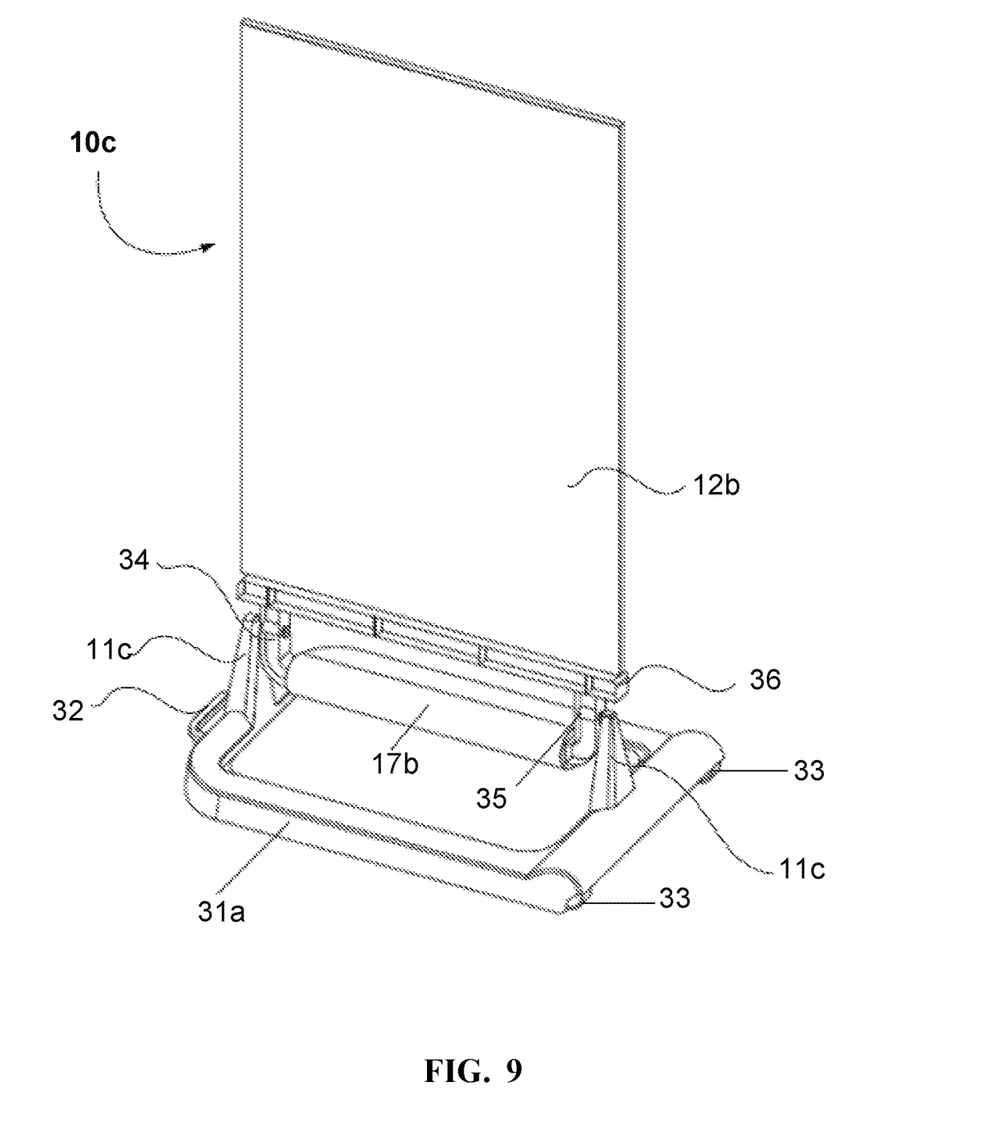
FIG. 9 shows a perspective view of a sign apparatus in accordance with another embodiment.

FIG. 9 shows a perspective view of an example embodiment of a portable sign apparatus 10c. In this example, the apparatus includes a base 31a and a support 36. In one example, counterweight 17b is attached to the support 36 via two support arms 34. The supports 34 include attachment points 35 that are coincident with a horizontal axis of rotation and are connected to the base 31a at the base support 11c. In another example, the support 36 includes a portion, such as attachment points 35, that defines a horizontal axis and the support is configured to secure a panel 12b in such a manner that provides a visible bottom edge of the panel (which may be the bottom of the panel, or may be above the actual bottom edge, but the actual bottom edge is within the support and is not visible). In this example, the sign apparatus includes a counterweight 17b attached to the support 36 and the base 31a is configured to hold the support such that the support may rotate about the horizontal axis from an initial rotational position. When the support is held by the base and the panel is secured by the support, a height of the horizontal axis of the support is equal to or lower than the visible edge of the panel.

In certain example embodiments, the counterweight 17b further includes an exterior surface defining an interior counterweight reservoir, and the counterweight reservoir is configured to receive a ballast material. In one example embodiment, the counterweight is a solid object. In other example embodiments, the counterweight has the shape of a cylinder, a rectangle, or a geometric prism, while in others it is irregular, or is a non-geometric shape. In other example embodiments, the sign apparatus 10c includes wheels 33 attached to the base 31a and is configured to move. In certain embodiments, the wheels may be removable, replaceable, or recessed into the base. In yet other example embodiments, the sign apparatus 10c includes a handle 32 attached to the base 31a and the apparatus is configured to move. In other embodiments, the handle 32 is removable, recessed or storable within the base 31a. In still yet other example embodiments, the support 36 may be ribbed, ventilated, hollow, or a solid material. In other example embodiments, components of the sign apparatus may include wood, metal, paper, ceramics, alloys, plastics, polymers, or combinations thereof.

Figure 10:
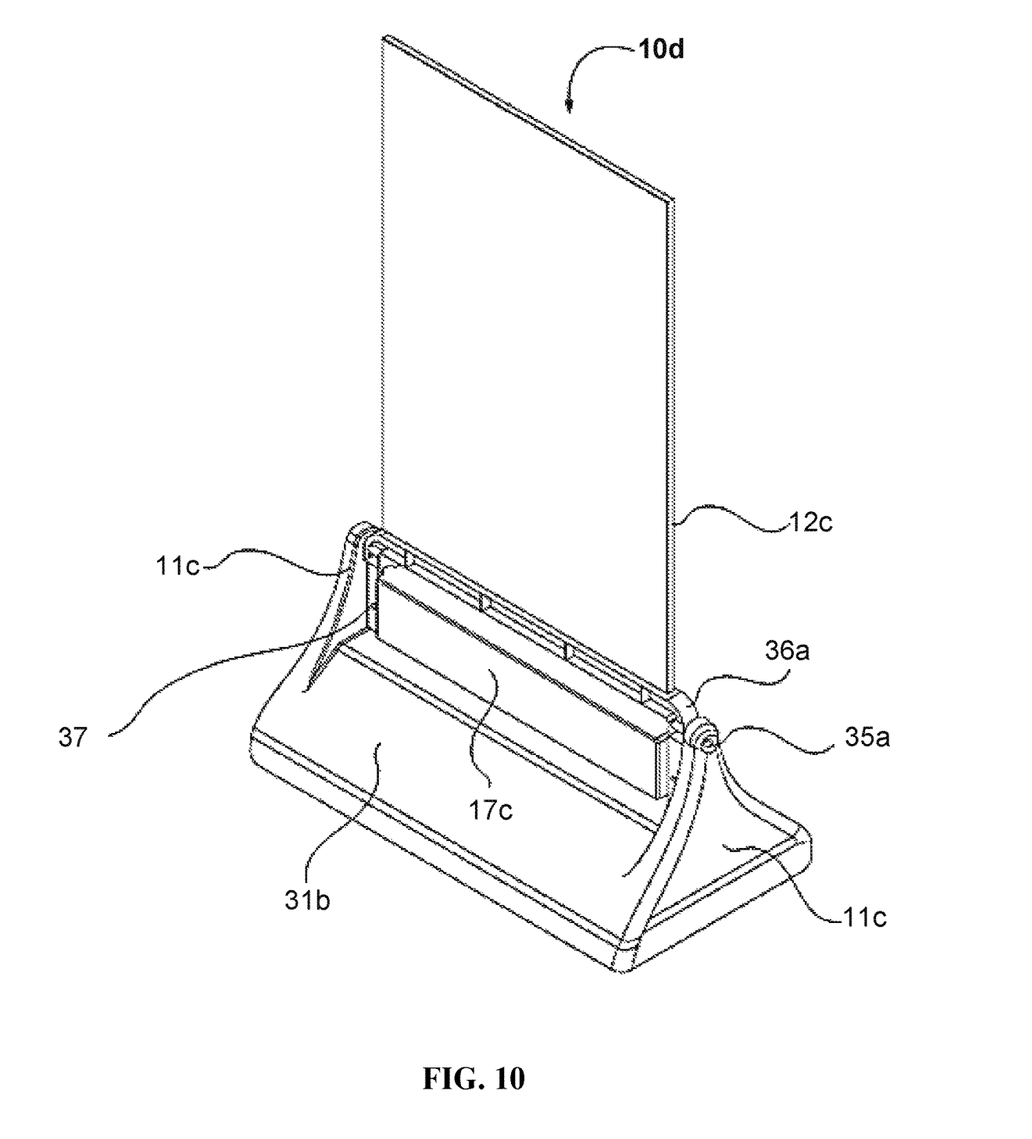
FIG. 10 shows a perspective view of a sign apparatus in accordance with another embodiment.

FIG. 10 shows a perspective view of an example embodiment of a portable sign apparatus 10d. In this example, the apparatus includes a base 31b and a support 36a. In one example, counterweight 17c is attached to support arms 37 that are connected to the support 36a via two base supports 11c. The base supports 11c include rotation points 35a that are coincident with a horizontal axis of rotation and are connected to the base 31b via the base supports 11c. The base supports may be present at the sides of the base, and extend up from the base at or near the edge, so as to allow rotation of the sign over the interior portion of the base, but still allow attachment of the support at an elevated height over the lower portions of the base. The base supports may be a variety of shapes, including triangular, semi-circular, or rectangular.

In this example, the sign apparatus includes a support, wherein a portion of the support defines a horizontal axis and the support is configured to secure a panel. The base 31b is configured to hold the support 36a such that the support may rotate about the horizontal axis from an initial rotational position. In another embodiment, the counterweight 17c is attached to the support and the counterweight further includes an exterior surface (e.g. a rectangular or cylindrical shaped surface) that defines an interior counterweight reservoir, and the reservoir is configured to receive a ballast material. The counterweight may have a first mass when the counterweight reservoir is filled with the ballast material and at least a majority of the first mass of the counterweight is disposed below the horizontal axis of the support when the support is in its initial rotational position, and the mass of the counterweight disposed below the horizontal axis exceeds a second mass disposed above the horizontal axis of the support when the support is in its initial rotational position, the second mass being configured to rotate with the support.

In certain example embodiments, when the support 36a secures the panel 12c, it provides a visible bottom edge of the panel and the horizontal axis is at or below the visible bottom edge, and the visible bottom edge is the bottom edge of the panel. In another example embodiment, the bottom edge of the panel is obscured within the support and the visible bottom edge is at a height relatively higher on the panel 12c. In yet another example embodiment, the base 31b includes an exterior surface that defines a base reservoir and the base reservoir is configured to receive a base ballast material. In still another example embodiment, the base reservoir includes one or more access mechanisms configured to provide selective access to the base reservoir. The ballast material can include a liquid medium, a solid material, or both.

In some embodiments with the exposed counterweight or a plurality of exposed counterweights, the counterweight(s) may include additional visual material or information, and such may be part of an integrated visual display as combined with the visual material on the rotating object or panel. Other embodiments may have simple or uniformly colored visual components so as to focus an observer's eyes on the desired visual information and/or advertisement. The support, base, or any other components may also include additional visual material, or be uniformly colored.

In accordance with another aspect, an apparatuses is disclosed, the apparatus comprising a base, rotation means configured to be connected to the base, wherein the rotation means are operably connected to one or more securing components configured to secure a panel having a first height at a bottom of the panel, a second height at a top of the panel, and a width, and a counterweight configured to be operably connected to the rotation means, the panel, or both. The rotation means may consist of or comprise any of the components described above (for example, components of the rotation positions and/or the support) and/or reflected in the example figures. In some examples, when the rotation means are connected to the base and the panel is secured, a horizontal rotational axis of the rotation means has a height equal to or lower than a third height, the third height being a midpoint between the first height and the second height of the panel. In various examples, when the rotation means are connected to the base and the panel is secured by the rotation means, the horizontal rotational axis of the rotation means has a height equal to or lower than a fourth height, the fourth height being one third the distance from the first height at the bottom of the panel to the second height at the top of the panel.

These descriptions of the various portable sign apparatuses are merely examples. Embodiments of the apparatus may comprise any of the features described above in reference to the example embodiments of the apparatus. In certain embodiments, the apparatus comprises additional combinations or substitutions of some or all of the components described above. Moreover, additional and alternative suitable variations, forms and components for the apparatus will be recognized by those skilled in the art given the benefit of this disclosure.

In another aspect of the disclosure, methods are provided. In some examples, an apparatus is placed in the desired location. The apparatus may be assembled in the desired location (e.g. the panel secured to the support, and the support being inserted or otherwise mounted into the base). Some embodiments of the method include partial prior assembly, while others contemplate transport of a fully assembled apparatus. The ballast may be added to the counterweight reservoir at the desired location, anchoring the sign in the chosen location and providing the resistance to increased wind velocities or other physical forces (i.e. human manipulation).

In some examples, the ballast is added before transport to the desired location, either as a stand-alone action or as part of a partial or complete assembly, while in others it is added on site. The counterweight and/or reservoir may be accessed via a base access mechanism to provide the ballast. In some examples, after displaying the sign or panel for the desired amount of time (e.g. a business day or during business hours) the counterweight reservoir is emptied of ballast to facilitate easier mobility and relocation of the apparatus. In other examples, the sign is merely moved and/or dissembled.

These descriptions are merely examples. In certain embodiments, the apparatuses and signs may include additional combinations or substitutions of some or all of the components described above. Moreover, additional and alternative suitable variations, forms, features and components will be recognized by those skilled in the art given the benefit of this disclosure. Still more, any of the features, forms and components discussed in the embodiments providing examples of the apparatuses, signs, counterweights, and/or fillable weight reservoirs may be features of one or more embodiments of these method aspects.

Any of the features or components discussed in the embodiments providing examples of the method aspects may be features of embodiments of the apparatus, and vice versa. Moreover, any of the steps of embodiments of the method aspects may be performed by embodiments of the apparatus. Moreover, additional and alternative suitable variations, steps and features for the methods will be recognized by those skilled in the art given the benefit of this disclosure.

The present disclosure is disclosed above and in the accompanying drawings with reference to a variety of examples and embodiments. The purpose served by the disclosure, however, is to provide examples of the various features and concepts related to the disclosure, not to limit the scope of the disclosure.

What is claimed is:

1. An apparatus comprising:
   a base;
   a support, wherein at least a portion of the support defines a horizontal axis, wherein the support comprises extension arms configured to secure a panel, wherein the extension arms extend into an interior of the panel, and wherein the support provides a visible bottom edge of the panel and wherein no components other than the panel are visible above the bottom edge of the panel; and
   a counterweight attached to the support; and
   wherein the base is configured to hold the support such that the support may rotate about the horizontal axis from an initial rotational position; and wherein, the support is configured to be held by the base and the panel is secured by the support, a height of the horizontal axis of the support is equal to or lower than a top edge of the support.

2. The apparatus of claim 1, wherein the counterweight further comprises an exterior surface defining an interior counterweight reservoir and wherein the counterweight reservoir is configured to receive a ballast material.

3. The apparatus of claim 1, wherein the counterweight has a shape of a cylinder.

4. The apparatus of claim 1, wherein the base includes wheels and is configured to move across a surface using the wheels.

5. The apparatus of claim 1, wherein the counterweight is a solid object.

6. An apparatus comprising:
   a base;
   a support, wherein at least a portion of the support defines a horizontal axis, wherein the support comprises extension arms configured to secure a panel, wherein the extension arms extend into an interior of the panel, and wherein the base is configured to hold the support such that the support may rotate about the horizontal axis from an initial rotational position;
   a counterweight attached to the support, wherein the counterweight further comprises an exterior surface defining an interior counterweight reservoir, and wherein the counterweight reservoir is configured to receive a counterweight ballast material;
   wherein the counterweight has a first mass when the counterweight reservoir is filled with the counterweight ballast material;
   wherein at least a majority of the first mass of the counterweight is disposed below the horizontal axis of the support when the support is in an initial rotational position; and
   wherein the mass of the counterweight disposed below the horizontal axis exceeds a second mass disposed above the horizontal axis of the support when the support is in the initial rotational position, the second mass being configured to rotate with the support; and wherein, the support is configured to be held by the base and provide a visible bottom edge of the panel, a height of the horizontal axis of the support is equal to or lower than the visible bottom edge of the panel, and no components other than the panel are visible above the visible bottom edge of the panel.

7. The apparatus of claim 6, wherein the horizontal axis is at or below the visible bottom edge of the panel.

8. The apparatus of claim 6, wherein the visible bottom edge is a bottom edge of the panel.

9. The apparatus of claim 6, wherein the counterweight ballast material comprises a liquid medium, a solid material, or both.

\* \* \* \* \*